United States Patent [19]
Rosaz

[11] 3,948,103
[45] Apr. 6, 1976

[54] CALIBRATION OF DIALED MEASURING INSTRUMENTS

[75] Inventor: Guy Francois Rosaz, Pontarlier, France

[73] Assignee: Scovill Manufacturing Company, Waterbury, Conn.

[22] Filed: Nov. 18, 1974

[21] Appl. No.: 524,953

[30] Foreign Application Priority Data
Nov. 23, 1973 France .............................. 73.41817

[52] U.S. Cl. ................................ 73/419; 116/129 A
[51] Int. Cl.² ............................................ G01L 7/16
[58] Field of Search ...................... 73/1 R, 4 R, 419; 116/129 F, 129 R, 129 AB, 129 A, 129 B

[56] References Cited
UNITED STATES PATENTS

| | | | |
|---|---|---|---|
| 1,234,774 | 6/1917 | Kocourek ............................ | 73/419 |
| 2,136,364 | 11/1938 | Lincoln ............................ | 116/129 A |
| 2,309,211 | 1/1943 | Raphael ............................ | 73/412 |
| 2,467,899 | 4/1949 | Lowkrantz ....................... | 116/129 A |

*Primary Examiner*—S. Clement Swisher
*Attorney, Agent, or Firm*—Robert E. Burns; Emmanuel J. Lobato; Bruce L. Adams

[57] ABSTRACT

An uniformly-graduated arcuate dial of a pressure gauge is mounted with play and fixed in a position to compensate for any deviation from a linear graphical relationship of the angular displacement of a pointer as a function of the pressure, by setting three graduations of the dial along three reference lines coinciding with the positions of the pointer at three corresponding reference pressures.

5 Claims, 7 Drawing Figures

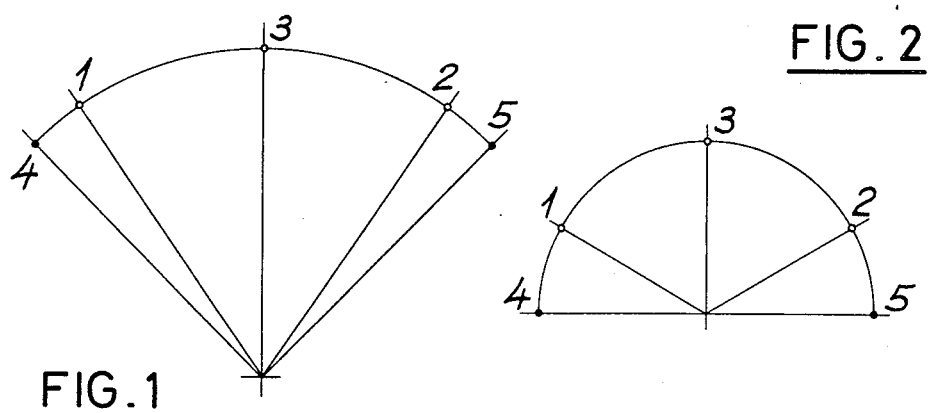
FIG. 2
FIG. 1
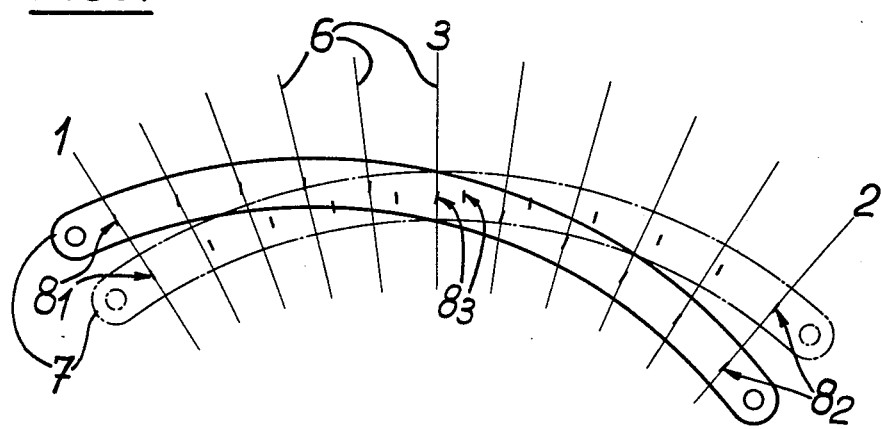
FIG. 4
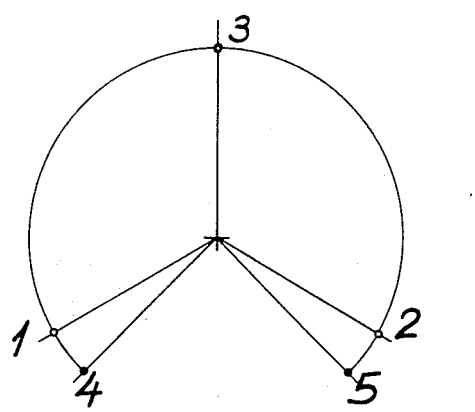
FIG. 3

3,948,103

CALIBRATION OF DIALED MEASURING INSTRUMENTS

The invention relates to dialed measuring instruments and to the calibration thereof.

A known method of calibrating a measuring instrument having an indicating hand or pointer pivoting about a graduated dial, for example a pressure gauge for vehicle tires, consists of supplying a reference pressure to the gauge and angularly turning the dial to bring the corresponding graduation under the hand. When the relationship between the angular displacement of the hand as a function of the applied pressure is not exactly linear (i.e. a first degree equation giving a rectilinear graphic representation), it is necessary to provide the dial with special graduations having a progressively increasing or decreasing spacing; otherwise if the graduations are equally spaced apart, the gauge will give inexact readings at all but the reference pressure.

According to proposed regulations governing the marking and calibration of pressure gauges for pneumatic tires, the scales of such gauges must have graduations which are equally spaced apart, and must give accurate readings over the entire extent of the graduated scale, a small tolerance being allowed to account for errors of parallax.

To meet up to these proposed regulations using the known methods of calibration would thus require the provision of means for very accurately transforming the progressive deformation of, for example, a spring in response to changes of pressure into a regular angular displacement of the indicating hand according to an exactly linear relationship, and this will involve manufacturing these means to very close tolerances.

A specific object of the invention is thus to provide a new method of calibrating pressure gauges which will enable compliance with the proposed regulations but without a need for the angular displacement of the indicating hand to vary as an exact linear function of the pressure to be measured.

A more general object of the invention is to enable the calibration of a measuring instrument including an indicating hand pivoting about a graduated dial having equally spaced graduations in arcuate configuration and in which the angular position of the hand is related to the quantity to be measured by an approximately linear relationship which may progressively deviate from linear, to compensate for such deviations.

The invention therefore provides a method for calibrating such an instrument comprising providing, prior to securing the dial, three reference lines corresponding to the positions of the indicating hand at three reference values of the quantity to be measured, said reference values corresponding to three given graduations on the dial. The dial is then shifted to a position in which said three given graduations lie along said reference lines, and is secured in position.

The dial is preferably brought to said position by placing two of said given graduations on the respective two reference lines and shifting the dial while maintaining said two graduations on said two lines to bring said third given graduation onto the third reference line.

Another object of the invention is to provide such a measuring instrument which is exactly calibrated to compensate for such a deviation by securing the dial in a given position.

According to this aspect of the invention, a measuring instrument comprises a casing, an indicating hand pivotally mounted in the casing about a fixed axis, means for angularly displacing the hand as an approximately linear function of a quantity to be measured, said function progressively deviating from linear, and a graduated dial provided with equally spaced graduations in arcuate configuration. Means are provided for selectively securing the dial in any one of a plurality of positions relative to the casing allowing an angular and a translational displacement of the dial relative to said axis. The dial is secured by said means in a selected position with the arcuate graduations placed to compensate for non-linearity of the displacement of the hand.

Another particular aspect of the invention is the provision of a pressure gauge which may be calibrated as set out above, and which conveniently displays readings of different pressure ranges on two separate graduated dials placed close together in a single casing, e.g. a hand-held casing.

Such a pressure gauge comprises a casing housing first and second arcuate graduated dials disposed at least approximately concentric to one another about a given axis; first and second indicating hands pivotally mounted about said axis, the first hand cooperating with the first dial and the second hand with the second dial; first and second cylinders and pistons; a common conduit leading to the first and second cylinders; first and second springs acting on the first and second pistons respectively to oppose displacement thereof in response to an increase of the pressure in said conduit, the first spring being weaker than the second spring; first and second transmission means for transmitting movement of the first and second pistons to the first and second hands respectively with an approximately linear relationship between angular displacement of the respective hands and the pressure in said conduit; and first and second stop means for limiting the movement of the first and second pistons to paths corresponding to displacement of the first and second hand respectively over the first and second dials; the relative strengths of the first and second springs and the positions of said first and second stop means being such that the first hand moves over the first dial during a first range of pressure values in said conduit and the second hand moves over the second dial during a second range of pressure values greater than said first range.

These and further features of the invention will now be described in detail, and by way of example, with reference to the accompanying schematic drawings, in which:

FIGS. 1, 2 and 3 are diagrams pertaining to the application of the calibrating method to dials having arcuate graduations extending over 90°, 180° and 270° respectively;

FIG. 4 is a diagram illustrating the principle of the calibrating method;

Figures 5, 5A:
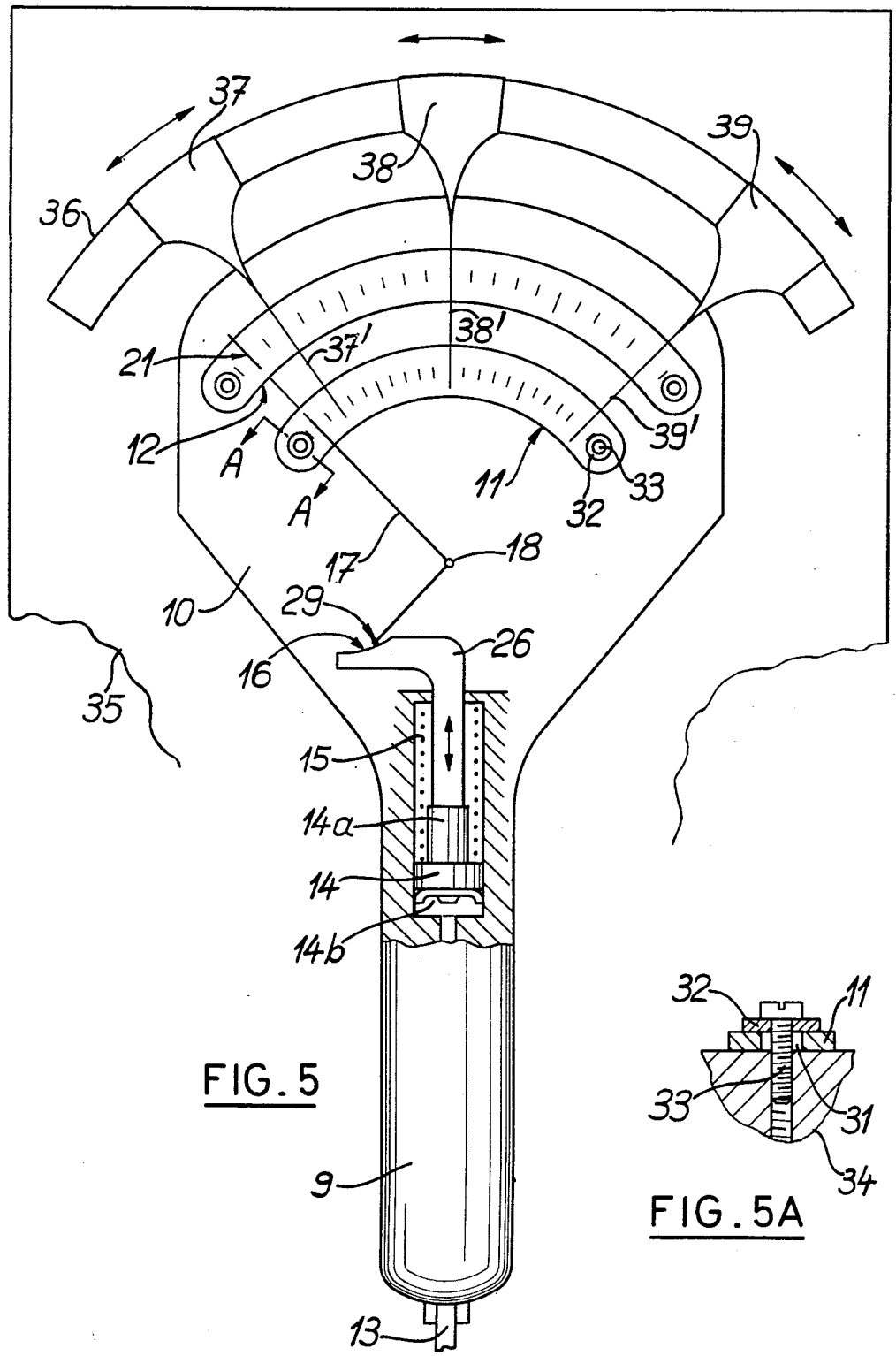
FIG. 5 is a front elevational view of a pressure gauge, shown partly cut-away with a front-plate removed, and partly in cross-section, mounted in a calibrating apparatus.
FIG. 5A is a cross-section of a detail, taken along line A—A of FIG. 5.

FIGS. 1, 2 and 3 schematically show the angular ranges of the indicating hand or pointer of a measuring instrument; the extreme positions of the hand being shown by radial lines 4 and 5. Depending on the range, for each instrument three characteristic positions of the hand are chosen, as indicated by lines 1 and 2 (near the extreme lines 4 and 5) and an intermediate line 3.

The same characteristic lines 1, 2 and 3 are also shown on FIG. 4, as well as eight intermediate lines 6, each of these lines corresponding to the positions of the hand for equal increments in the quantity being measured, the angular displacement of the hand for each increment increasing progressively from line 1 to line 2.

As shown in FIG. 4, an arcuate dial 7 has eleven equally spaced graduation lines in arcuate configuration, the extreme graduations $8_1$ and $8_2$ representing values corresponding to the characteristic values of the quantity being measured as given by lines 1 and 2 and the median graduation $8_3$ corresponding to line 3.

When, as shown in broken lines in FIG. 4, the dial 7 is placed substantially symmetrical to the median characteristic line 3 and with graduations $8_1$ and $8_2$ lying on lines 1 and 2 respectively, it can be seen that the instrument reads correctly for the values corresponding to graduations $8_1$ and $8_2$, but that all of the intermediate positions of the hand are staggered from the corresponding graduations, so that the instrument will give inaccurate readings.

By shifting the dial 7, keeping the graduations $8_1$ and $8_2$ on lines 1 and 2, it is possible to bring the graduation $8_3$ onto line 3, as shown in full lines in FIG. 4. It is observed that in this position of the dial, all of the intermediate graduations lie on, or very close to, the corresponding characteristic lines 6, so that the instrument will give accurate readings along the entire extent of the graduated scale.

To calibrate an instrument, the following procedure is thus adopted:

1. prior to securing the dial 7, a standard quantity corresponding to the value of graduation $8_1$ is fed to the instrument, and the corresponding position of the indicating hand is recorded by providing a reference line 1 coincident therewith. This reference line 1 may conveniently be a pointer on a cursor, as will be described in detail with reference to FIG. 5;

2. reference lines 2 and 3 corresponding to graduations $8_1$ and $8_2$ are provided in a similar manner;

3. the dial 7 is then shifted to bring two of the dial reference graduations, for example $8_1$ and $8_2$, onto the corresponding reference lines 1, 2;

4. the dial 7 is then further shifted to bring the third reference graduation onto the third reference line while maintaining the first two dial reference graduations on the corresponding reference lines, and is then fixed in place, the instrument being exactly calibrated whether the indicating hand moves with an exact linear relationship to the quantity to be measured, or whether there is a progressive deviation from linear.

A specific example of the application of this method of calibration to a pressure gauge will now be described in detail.

Figure 6:
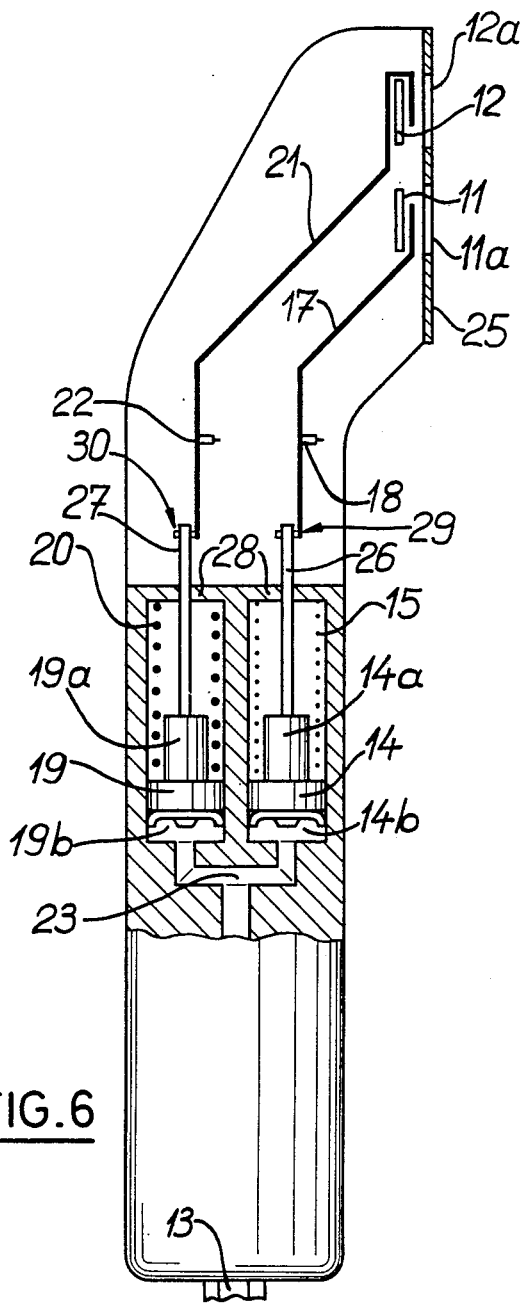
FIG. 6 is a side elevational view, partly in cross-section, of the pressure gauge shown in FIG. 5.

FIGS. 5 and 6 show an automobile tire pressure gauge comprising a casing 10 including a handle 9 and two arcuate dials 11 and 12 each bearing equal arcuate graduations disposed beneath a removable cover plate 25 including arcuate windows 11a, 12a through which dials 11 and 12 are visible.

A flexible tube 13 delivers pressurized air (e.g. from an automobile tire) into a conduit 23 in handle 9 leading into two separate chambers 14b, 19b of cylinders housing pistons 14, 19 respectively. The pistons have respective compression springs 15 and 20 opposing displacement thereof in response to an increase in the pressure in conduit 23, spring 20 being stronger than spring 15. The pistons are extended by respective elongated pushers 26, 27 slidably passing through apertures in an upper wall 28 closing the piston cylinders, each piston also having a cylindrical stop 14a, 19a which limits the upper path of the respective piston by abutment against wall 28.

The pushers 26, 27 each have on their upper face a curved cam surface 16 cooperating with a pin 29, 30 on an arm fixed on a respective pointer 17, 21 to transmit movement of the piston 14 or 19 in response to change in the pressure in chamber 23 into an angular displacement of the respective pointer 17, 21 about their aligned pivoting pins 18, 22. The schematically-indicated shapes of the cam surfaces are chosen as a function of the characteristics of springs 15 and 20 to provide an approximately linear (i.e. regular) relationship between the pressure in conduit 23 and the angular position of the respective pointer. This relationship may be exactly linear, or close to linear with a progressive deviation depending upon the manufacturing tolerances of the springs, the cam surfaces and so on. Abutment of the respective piston stop 14a, 19a against wall 28 corresponds to an angular position of pointers 17, 21 at the extreme right hand end (looking at FIG. 5) of the reading windows 11a, 12a.

Also, the strength of springs 15, 20 is such that stop 14a comes to abut against wall 28 at a pressure value at which piston 19 begins to move up. Consequently pointer 17 provides indications of a lower pressure range and pointer 21 indications of an upper pressure range. It is also noted that if an excessive pressure is supplied to tube 13, the abutment of stops 14a and 19a against wall 28 will avoid any damage to the instrument.

The pointers 17, 21 cooperate with respective arcuate graduated dials 11 and 12 disposed below windows 11a and 12a. Each of the dials has a series of equispaced graduations and is secured in casing 10 by a device, shown in FIG. 5a, which enables positioning of the dial for the purpose of calibration. The securing device comprises at the ends of both dials a round hole 31, a washer 32 and a screw 33 screwed into a support 34 in casing 10. The openings 31 are of greater diameter than screws 33 to enable a play in the mounting of the dials.

Calibration of the described gauge is carried out by placing it, with the cover plate 25 removed and with dials 11 and 12 loosely mounted by screws 33, into a calibrating apparatus 35 (FIG. 5) where it is held with the pins 18, 22 of pointers 17, 21 coaxial to an arcuate groove or rail 36 on which three cursors 37, 38, 39 are slidably mounted. These cursors have respective inwardly-directed pointers 37', 38', 39' overlying both dials 11 and 12, and are provided with means (not shown) such as micrometer screws for accurately adjusting their positions along the groove or rail 36. The apparatus 35 also includes means not shown for delivering six accurately known reference pressures to the tube 13 of the manometer, these reference pressures corresponding to the values of graduations towards the ends and the middle of the two dials 11 and 12.

To calibrate dial 11, the three lower reference pressures are successively supplied to tube 13, and the positions of cursors 37, 38 and 39 adjusted to make the pointers 37', 38', 39' coincide with the respective positions taken by pointer 17. Dial 11 is then shifted, as previously described, to make the three corresponding graduations coincide with the pointers 37', 38', 39' and the two screws 33 are tightened to secure the dial 11 in place. A similar procedure is then carried out for dial 12, after resetting the cursors 37, 38, 39 to correspond to the positions of hand 21 for the three upper reference pressure values.

After calibration and fixing of both dials 11 and 12, the pressure gauge is removed from apparatus 35 and the cover plate 25 fixed in place.

What is claimed is:

1. A method of calibrating a measuring instrument including an indicating hand pivoting about a graduated dial having equally spaced graduations in arcuate configuration and in which the angular position of the hand is related to the quantity to be measured by an approximately linear relationship which may progressively deviate from linear, comprising:
    providing, prior to securing the dial, three reference lines corresponding to the positions of the indicating hand at three reference values of the quantity to be measured, said reference values corresponding to three given graduations on the dial;
    shifting the dial to a position in which said three given graduations lie along said reference lines;
    and securing the dial in said position.

2. A method according to claim 1, in which the dial is brought to said position by placing two of said given graduations on the respective two reference lines and shifting the dial while maintaining said two graduations on said two lines to bring said third given graduation onto the third reference line.

3. A measuring instrument comprising a casing; an indicating hand pivotally mounted in the casing about a fixed axis; means for angularly displacing the hand as an approximately linear function of a quantity to be measured, said function progressively deviating from linear; a graduated dial provided with equally spaced graduations in arcuate configuration; and means for selectively securing the dial in any one of a plurality of positions relative to the casing allowing an angular and a translational displacement of the dial relative to said axis, the dial being secured by said means in a selected position with the arcuate graduations placed to compensate for non-linearity of the displacement of the hand.

4. A pressure gauge comprising:
    a casing housing first and second arcuate graduated dials disposed at least approximately concentric to one another about a given axis, said dials each having equally spaced graduations disposed in an arcuate configuration;
    first and second indicating hands pivotally mounted about said axis, the first hand cooperating with the first dial and the second hand with the second dial to indicate measured values of pressure;
    first and second cylinders and pistons, wherein said first piston is slidably disposed within said first cylinder and said second piston is slidably disposed within said second cylinder;
    a common conduit leading to the first and second cylinders for applying pressure changes to said cylinders to displace the respective pistons therein;
    first and second springs acting on the first and second pistons respectively to oppose displacement thereof in response to an increase of the pressure in said conduit, the first spring being weaker than the second spring;
    first and second transmission means for transmitting movement of the first and second pistons to the first and second hands respectively with an approximately linear relationship between angular displacement of the respective hands and the pressure in said conduit;
    means for selectively securing each of said first and second dials in any one of a plurality of positions relative to the casing, each dial being secured by said means in a selected position with the arcuate graduations placed to compensate for possible non-linearity of the displacement of the respective hand;
    and first and second stop means for limiting the movement of the first and second pistons to paths corresponding to displacement of the first and second hands respectively over the first and second dials; wherein
    the relative strengths of the first and second springs and the positions of said first and second stop means being such that the first hand moves over the first dial during a first range of pressure values in said conduit and the second hand moves over the second dial during a second range of pressure values greater than said first range.

5. A pressure gauge comprising:
    a casing housing first and second arcuate graduated dials disposed at least approximately concentric to one another about a given axis;
    first and second indicating hands pivotally mounted about said axis and each having an arm extending therefrom, the first hand cooperating with the first dial and the second hand with the second dial to indicate measured values of pressure;
    first and second cylinders and pistons, wherein said first piston is slidably disposed within said first cylinder and said second piston is slidably disposed within said second cylinder;
    a common conduit leading to the first and second cylinders for applying pressure changes to said cylinders to displace the respective pistons therein;
    first and second springs acting on the first and second pistons respectively to oppose displacement thereof in response to an increase of the pressure in said conduit, the first spring being weaker than the second spring;
    first and second transmission means for transmitting movement of the first and second pistons to the first and second hands respectively with an approximately linear relationship between angular displacement of the respective hands and the pressure in said conduit, said first and said second transmission means each comprising a cam fixed to a respective one of said pistons and cooperative with a respective one of said arms extending from said indicating hands for pivoting the indicating hands upon changes of pressure applied to said cylinders thereby to indicate pressure by the position of said hands relative to said dials;
    and first and second stop means for limiting the movement of the first and second pistons to paths corresponding to displacement of the first and second hands respectively over the first and second dials; wherein
    the relative strengths of the first and second springs and the positions of said first and second stop means being such that the first hand moves over the first dial during a first range of pressure values in said conduit and the second hand moves over the second dial during a second range of pressure values greater than said first range.

* * * * *